(12) United States Patent
Wallace et al.

(10) Patent No.: US 8,620,467 B2
(45) Date of Patent: *Dec. 31, 2013

(54) METHOD AND APPARATUS FOR ASSEMBLING A COMPLEX PRODUCT IN A PARALLEL PROCESS SYSTEM

(75) Inventors: Richard A. Wallace, Washington, MI (US); John Graham, Clinton Township, MI (US); Theodore Robert Brown, Birmingham, MI (US)

(73) Assignee: Comau Inc., Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,190

(22) Filed: Jun. 22, 2012

(65) Prior Publication Data

US 2013/0158696 A1 Jun. 20, 2013

Related U.S. Application Data

(63) Continuation of application No. 12/102,046, filed on Apr. 14, 2008, now Pat. No. 8,229,586.

(60) Provisional application No. 61/007,307, filed on Dec. 12, 2007.

(51) Int. Cl.
*G05B 11/01* (2006.01)
*G06F 19/00* (2011.01)
*G06F 7/00* (2006.01)
*G06F 17/00* (2006.01)

(52) U.S. Cl.
USPC ............. 700/95; 700/19; 700/20; 700/96; 700/111; 700/112; 700/114; 700/213; 700/228; 700/230; 700/245

(58) Field of Classification Search
USPC ......... 700/19–20, 95–96, 111–112, 114, 213, 700/228, 230, 245
See application file for complete search history.

(56) References Cited

U.S. PATENT DOCUMENTS 4,369,563 A * 1/1983 Williamson ............... 483/7
4,815,190 A * 3/1989 Haba et al. ............... 29/430

* cited by examiner

*Primary Examiner* — Ronald Hartman, Jr.
(74) *Attorney, Agent, or Firm* — Young Basile Hanlon & MacFarlane P.C.

(57) ABSTRACT

A method and apparatus for assembling a complex product in a parallel process system wherein a collection of components are provided for assembling the complex product. The present invention involves transferring the collection of components to one of a plurality of similar computerized assembly cells through the use of a transport system. The collection of components is automatically assembled into the complex product through the use of the computerized assembly cells. The complex product is then transferred from one of the assembly cells to a computerized test cell, where the complex product is tested to ensure for the proper dimensioning and functioning of the complex product. The complex product is then transferred from the test cell via the transport system to either a part reject area or conveyor, if the product is defective, or to an automatic dunnage load or part return system, if the product is not defective.

14 Claims, 16 Drawing Sheets

METHOD AND APPARATUS FOR ASSEMBLING A COMPLEX PRODUCT IN A PARALLEL PROCESS SYSTEM

CROSS-REFERENCE TO RELATED APPLICATIONS

The subject application is a continuation of U.S. patent application Ser. No. 12/102,046, filed on Apr. 14, 2008, which claims the priority of U.S. Provisional Patent Application Ser. No. 61/007,307, filed on Dec. 12, 2007.

FIELD OF THE INVENTION

The present invention relates to methods and apparatuses for assembling complex products and, in particular, a method and apparatus for assembling manufacturing products that utilize flexible and programmable assembly and test cells to enhance the quality and efficiency of assembling a complex product in a parallel process system.

BACKGROUND OF THE INVENTION

In today's manufacturing industry, the customary manner of assembling products is with an assembly line in a serial process system. A serial process system is defined as having the complex product travel through successive, single operations or stations in order to complete the assembly of the complex product. Serial process systems are even more common when such products are complex in nature, thereby requiring the assembly of a variety of different subcomponents and various individual components in various locations on the product.

Typically, the serial process of an assembly line begins with the delivery of a complex product to the assembly line, wherein the complex product is then loaded into an assembly line transport system, either automatically or manually. The transport system carries the complex product to a variety of workstations along the assembly line, wherein the various components and subcomponents are assembled into the complex product. For example, in a serial processed engine cylinder head assembly line, spark plugs may be installed into the cylinder head at the first workstation, and after the spark plugs are installed, the transport system may carry the cylinder head to a second workstation, wherein the cylinder head may be rotated so that additional componentry may be assembled on the underside or opposite side of the cylinder head. Cylinder head valves may be installed into the cylinder head at a subsequent workstation, and upon traveling to the next workstation, the cylinder head may be rotated back to its original position. The following workstation may then be responsible for installing valve springs into the cylinder head. The transport system continues to carry the cylinder head from workstation to workstation until the cylinder head is completely assembled. The number of workstations on the assembly line may vary depending on the type of cylinder head or componentry. Typically, the number of workstations range in the neighborhood of six to eight with the transport system passing through or adjacent to each of the workstations.

The timing of the workstations and the transport system is critical for such assembly lines. In the above-noted example, the complex product moves from one workstation to the next, wherein the transport system may stop to allow for an operation to be performed at each of the workstations. A certain amount of time may even be designated for completing a specific task at a specific workstation.

Although assembly lines have been utilized throughout the history of the manufacturing industry, such assembly lines are plagued with inefficiencies. For instance, assembly lines within the automotive industry are typically dedicated to a particular component of an automobile and for a specific model of an automobile. Thus, such assembly lines cannot be utilized to manufacture any component of an automobile, but rather, they can be only utilized to build certain specific components. Therefore, if the particular component is no longer needed, for instance, if the particular model of automobile in which the component is utilized is no longer being manufactured, then the particular assembly line cannot be utilized without major retooling. Therefore, the assembly line must be retooled or disassembled, and a new assembly line must be installed. This is, of course, a very timely and costly task and one that is undesirable in an industrial environment.

As previously mentioned, such assembly lines are typically timed to provide each laborer at a particular workstation a specific amount of time under which to complete the operation at that particular workstation. If a problem occurs at that particular workstation such that the task can no longer be performed, for instance, a tool breaks, the transport system shuts down, certain components are defective, etc., then the entire assembly line may have to be shut down until the problem is corrected. When this occurs, manufacturing of the particular product is halted, thereby causing a shortage of the product being manufactured or assembled on that particular assembly line. Such a shortage of products could create shortages in other assembly lines thereby requiring other assembly lines to shut down. Thus, manufacturing facilities often produce a surplus of components so that a sufficient supply of components is provided should the assembly line break down or stop. Such uncertainty in the operation of the assembly line may lead to a shortage or a surplus of components. A shortage of components may lead to other assembly lines being short of parts, and a surplus of components may mean that unnecessary parts have been produced, thereby wasting time and money. Either situation creates an inefficiency that is undesirable in an industrial environment.

Lastly, assembly lines often span across a rather large area of the manufacturing facility in order to provide a sufficient amount of space for the transport system, the work stations, and the laborers. The floor space in a manufacturing facility can be rather expensive, and therefore, it is always desirable to reduce the amount of floor space to produce a particular product.

It would be desirable to produce a method and apparatus for assembling a complex product that could produce a variety of different products, that could produce a specific number of components when needed, and that would require a minimum amount of factory floor space.

SUMMARY OF THE INVENTION

The present invention provides for a method and apparatus for assembling a complex product in a parallel process system, wherein the method includes providing a collection of subcomponents and at least one base component to a loading station for assembling the complex product. The collection of subcomponents and the at least one base component are automatically transported to one of a plurality of similar computerized assembly cells through the use of a transport system. The collection of subcomponents and the at least one base component are automatically assembled into the complex product through the use of one of the plurality of similar computerized assembly cells. The complex product is automatically transported from one of the plurality of similar computerized assembly cells to one of the at least one computerized test cells through the use of the transport system. The complex product is automatically tested in the at least one computerized test cell to ensure for the proper assembly functionality of the complex product. The complex product is automatically transported to a delivery station through the use of the transport system.

The steps of providing the collection of subcomponents and the at least one base component may further comprise the steps of providing a part delivery system for supplying the at least one base component to the transport system. A kit delivery system may also be provided for supplying the subcomponents in a kit container to the transport system. The step of providing a part delivery system may further provide a conveyor for delivering the at least one base component to the transport system. The step of providing a kit delivery system for supplying the subcomponents in the kit container may further provide the steps of automatically assembling the subcomponents into the kit container through the use of at least one kit assembly cell. A conveyor may also be provided for delivering the kit container to the transport system. The steps of providing a part delivery system may also include the steps of providing a conveyor for delivering the kit container with said subcomponents assembled therein to the transport system.

The steps of transporting the collection of the subcomponents and the at least one base component may further provide the step of providing an overhead gantry system for transporting the kit container, the at least one base component, the complex product to and from the loading station, the plurality of assembly cells, the at least one test cell, and the delivery station. The step of transferring the collection of the subcomponents and the at least one base component may, in the alternative, provide a computerized robotic arm for automatically transporting the kit container, the at least one base component, the complex product to and from the loading station, the plurality of assembly cells, the at least one test cell, and the delivery station.

The method of the present invention may also include securing the at least one base component in a rollover fixture in one of the plurality of computerized assembly cells for rotating the at least one base component in a desired orientation. In addition, the method may include placing the kit container within one of the plurality of computerized assembly cells. The method of the present invention may also include providing a computerized tool changer in each of the computerized assembly cells for automatically providing an appropriate tool for assembling the subcomponents to the at least one base component for forming the complex product. The method also includes providing three axes of linear movement between the at least one base component and the appropriate tool. In addition, the method of the present invention may include securing the complex product in the rollover fixture and the at least one computerized test cell for rotating the complex product in the desired orientation. The method may include providing a computerized test tool changer in each of the at least one test cell for automatically providing an appropriate test tool for testing the complex product. Three axes of linear movement may be provided between the complex product and the appropriate test tool.

The apparatus of the present invention for assembling a complex product in a parallel process system may include a loading station for providing a collection of subcomponents and at least one base component required for assembling the complex product. A plurality of computerized assembly cells automatically assemble the subcomponents to the base components to form the complex product. At least one computerized test cell automatically tests the complex product for the proper assembly functionality of the complex product. A delivery station receives the complex product after the complex product is tested. A transport system transports the subcomponents, the at least one base component, and the complex product to and from the loading station, the plurality of assembly cells, the at least one test cell, and the delivery station.

The loading station of the apparatus of the present invention may further include a part delivery system for delivering the at least one base component to the transport system. A kit delivery system delivers a kit container having the subcomponents contained therein to the transport system. The part delivery system of the apparatus of the present invention may provide a conveyor for delivering the at least one base component to the transport system. The kit delivery system of the apparatus of the present invention may further provide a conveyor for delivering the kit container to the transport system. The kit delivery system may also provide an automatic kit assembly cell for receiving and assembling the subcomponents into the kit container. A conveyor delivers the kit container to the transport system.

The transport system of the apparatus of the present invention further provides a computerized overhead gantry system for automatically picking and placing the kit container, the at least one base component, the complex product to and from the loading station, the computerized assembly cells, the at least one computerized test cell, and the delivery station. In the alternative, the transport system may include a computerized robotic arm for automatically picking and placing the kit container, the at least one base component, and the complex product to and from the loading station, the automatic assembly cell, the at least one automatic test cell, and the delivery station.

The computerized assembly cells of the apparatus of the present invention may include a rollover fixture mounted within each of the assembly cells for securing and rotating the at least one base component in a desired orientation for assembling the subcomponents thereto. A kit container fixture within each of the computerized assembly cells receives the kit container. A computerized tool changer within each of the assembly cells automatically provides an appropriate tool for assembling the subcomponents in the kit container to the at least one base component. A rollover fixture and the computerized tool changer are moveable with respect to one another in three axes of linear motion.

The at least one computerized test cell of the apparatus of the present invention further provides a rollover fixture mounted within each of the at least one automatic test cell for securing and rotating the complex product in a desired orientation for testing the complex product. A computerized tool changer within the at least one test cell automatically provides an appropriate test tool for testing the complex product. The rollover fixture and the appropriate test tool are moveable with respect to one another in three axes of linear movement.

The delivery station of the apparatus of the present invention may further provide a first area within the delivery station for receiving the complex products that are defective. A second area within the delivery station receives the complex products that are non-defective.

The assembly cells and test cells of the apparatus of the present invention may further provide a carriage having the rollover fixture and the kit container fixture connected thereto. A pair of rails slidingly receive the carriage, and the rails extend to and from the assembly cell and the test cell, wherein the carriage moves between an unloaded position, wherein the carriage is outside the assembly cell and test cell, and a loaded position, wherein the carriage is within the assembly cell and the test cell.

BRIEF DESCRIPTION OF THE DRAWINGS

Various other uses of the present invention will become more apparent by referring to the following detailed descriptions and drawings, and which.

DETAILED DESCRIPTION OF THE EMBODIMENTS

Figure 1:
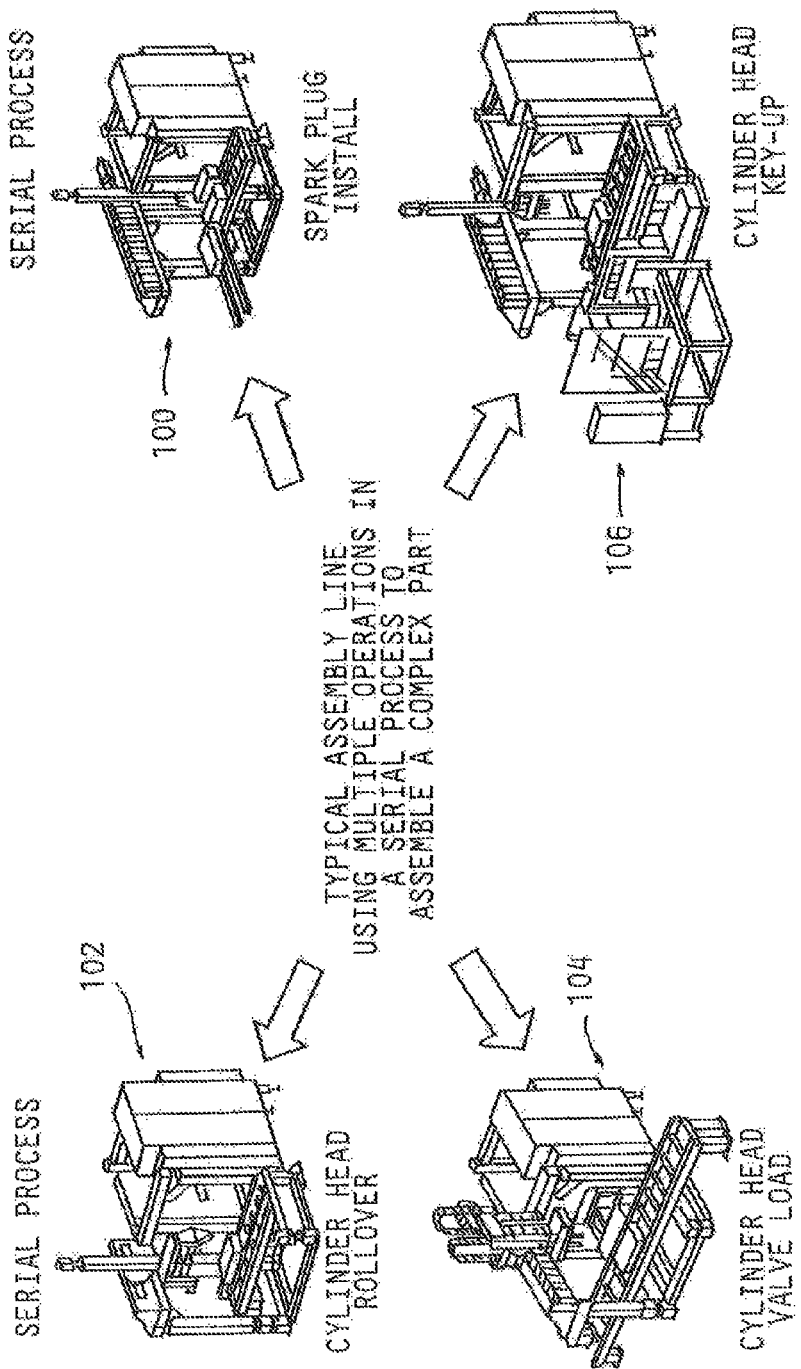
FIG. 1 is a description of a prior art method and apparatus for assembling a complex product with the conventional assembly line serial process.

Referring to the drawings, the present invention will now be described in detail with reference to the disclosed embodiments.

FIGS. 3-14 illustrate a method and apparatus 10 for assembling a complex product 12 in a parallel process system of the present invention. The method and apparatus 10 for assembling the complex product 12 provides a loading station 13 having a part delivery system 14 and a kit delivery system 16 that deliver the necessary components to the apparatus 10 of the present invention. A transport system 18, which may include, but is not limited to, an overhead gantry or a robot system, extends over the length of the apparatus 10 and independently picks and carries the components from the part delivery system 14 and kit delivery system 16 of the loading station 13 to one of a plurality of similar, computerized assembly cells or workstations 20. In the alternative, the loading and unloading of the components into the assembly cells 20 may be done manually. Each of the computerized assembly cells 20 is substantially similar and automatically assembles the various components to form the complex product 12. Since the assembly cells 20 are similar and perform the same operation, the method and apparatus 10 of the present invention is described as a parallel process system. Once the assembly of the complex product 12 is completed within one of the assembly cells 20, the transport system 18 transports the complex product 12 from the assembly cell 20 to a computerized test cell or workstation 22. In the alternative, the loading and unloading of the complex product 12 into the test cell 22 may also be done manually. The complex product 12 is automatically tested, and the transport system 18 delivers the complex product 12 to a delivery station 23. The delivery station 23 has a part reject area or conveyor 24, wherein the complex product 12 is defective, or an automatic part dunnage load system or part return system 26, wherein the complex product 12 is not defective.

The method and apparatus 10 for assembling the complex product 12 in a parallel process system of the present invention is modeled for the assembling and testing of automotive engine cylinder heads. However, the present invention is not limited to this application, but rather, the present invention may be utilized for assembling and testing other complex products (not shown), such as automotive transmission cases, automotive engine piston and rod assemblies, automotive engine piston insertions, various non-automotive complex products, applications that may involve a certain amount of danger or risk, and applications that require a clean environment. For purposes of the specification, we will refer to the cylinder head as our complex product 12.

Figure 3:
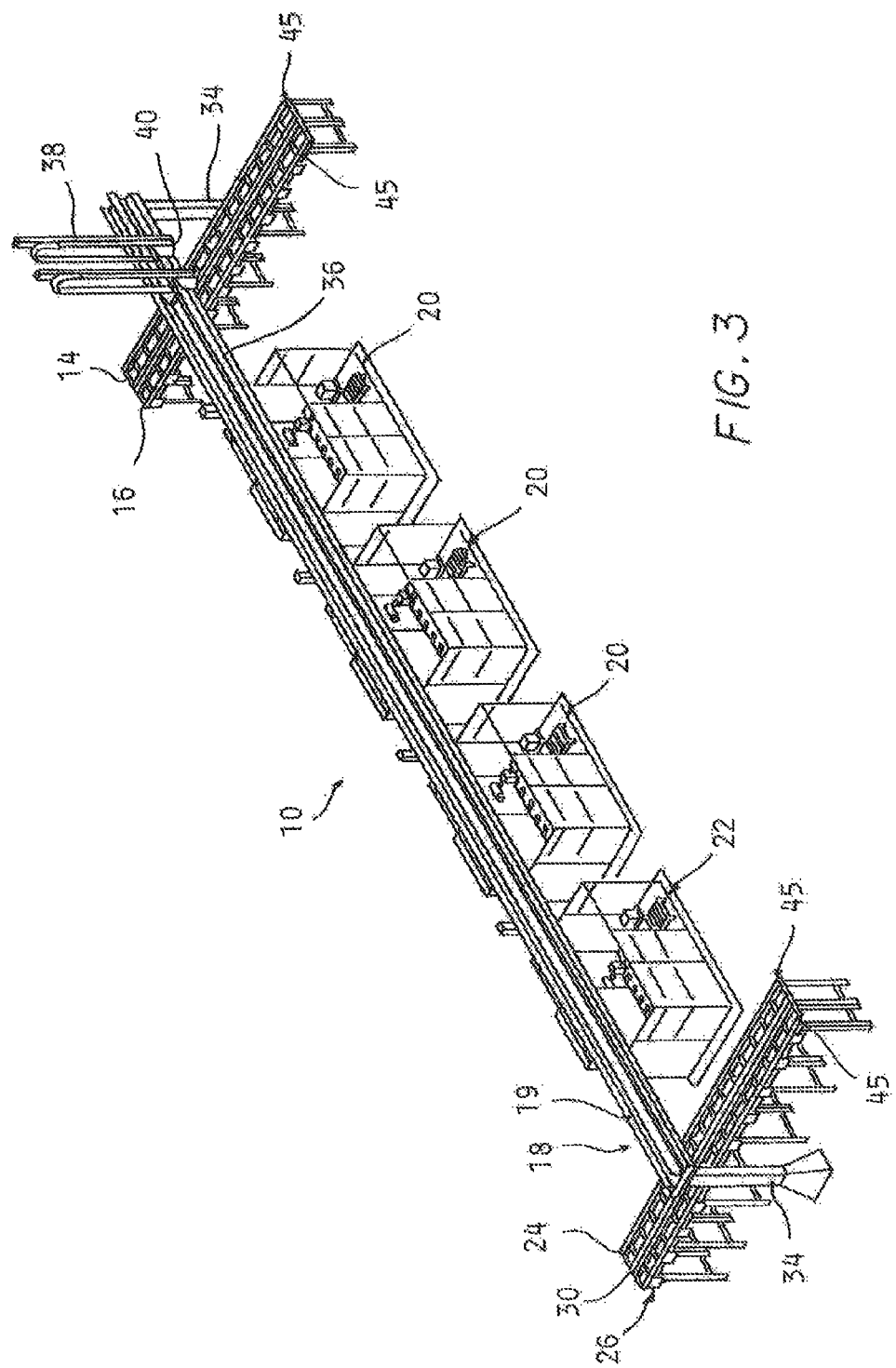
FIG. 3 is an overhead isometric drawing of the method and apparatus for assembling a complex product in a parallel process system of the present invention.
Figure 4:
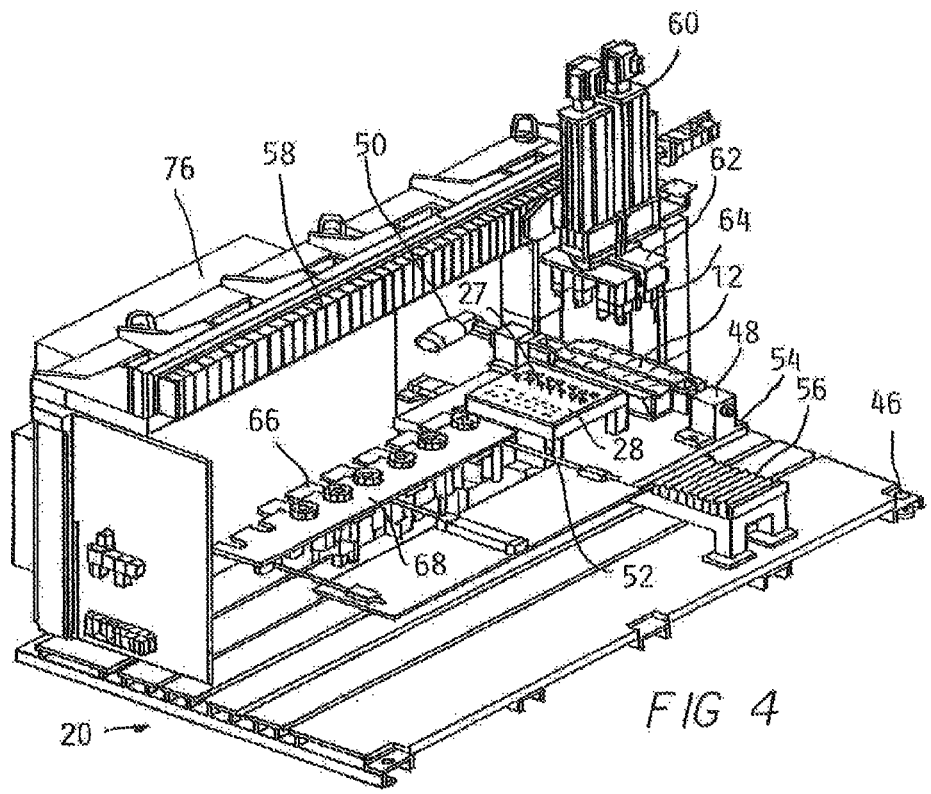
FIG. 4 is an isometric drawing of an assembly cell of the method and apparatus for assembling a complex product in a parallel process system of the present invention.
Figure 5:
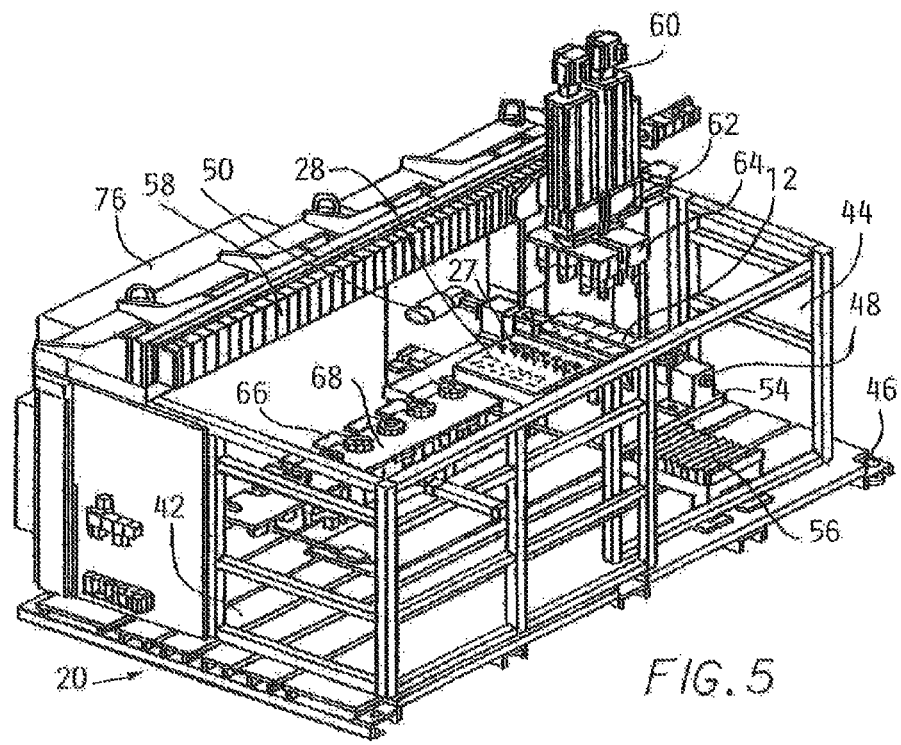
FIG. 5 is an isometric drawing of an assembly cell of the method and apparatus for assembling a complex product in a parallel process system of the present invention wherein the assembly cell has guard panels and interlocking doors.
Figure 6:
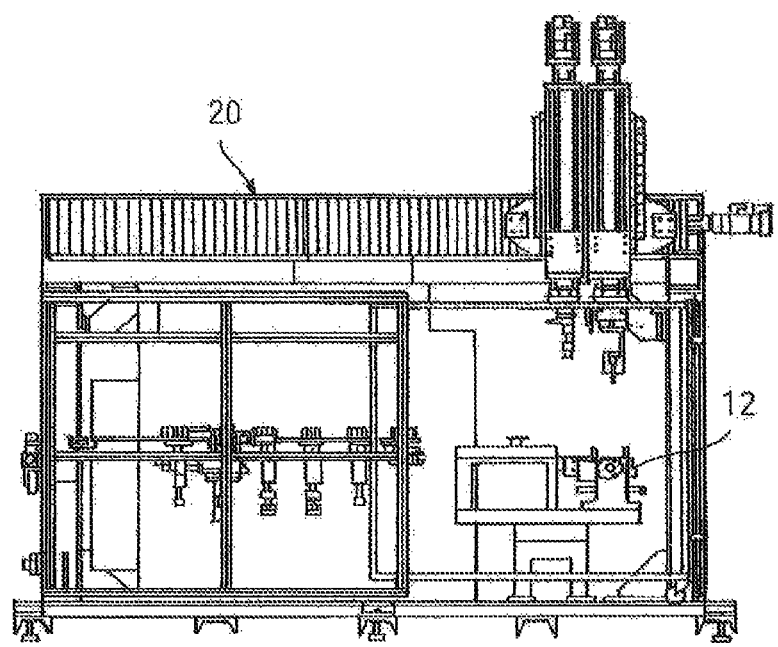
FIG. 6 is a side view of the assembly cell of the method and apparatus for assembling a complex product in a parallel process system of the present invention.
Figure 7:
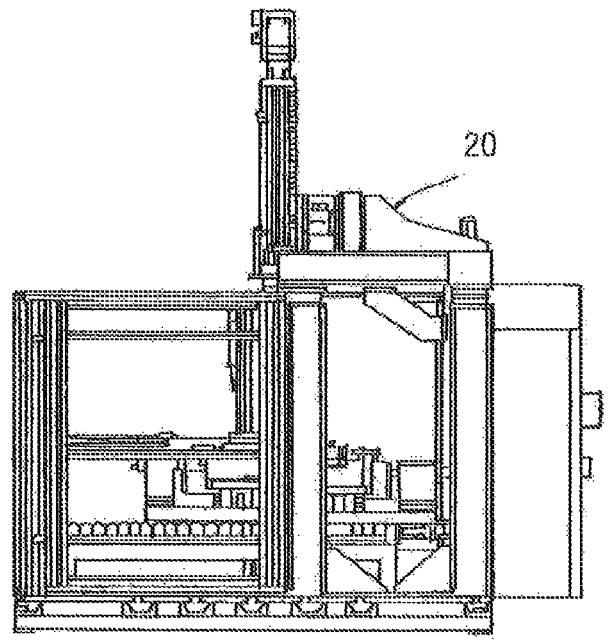
FIG. 7 is an end view of the assembly cell of the method and apparatus for assembling a complex product in a parallel process system of the present invention.
Figure 11:
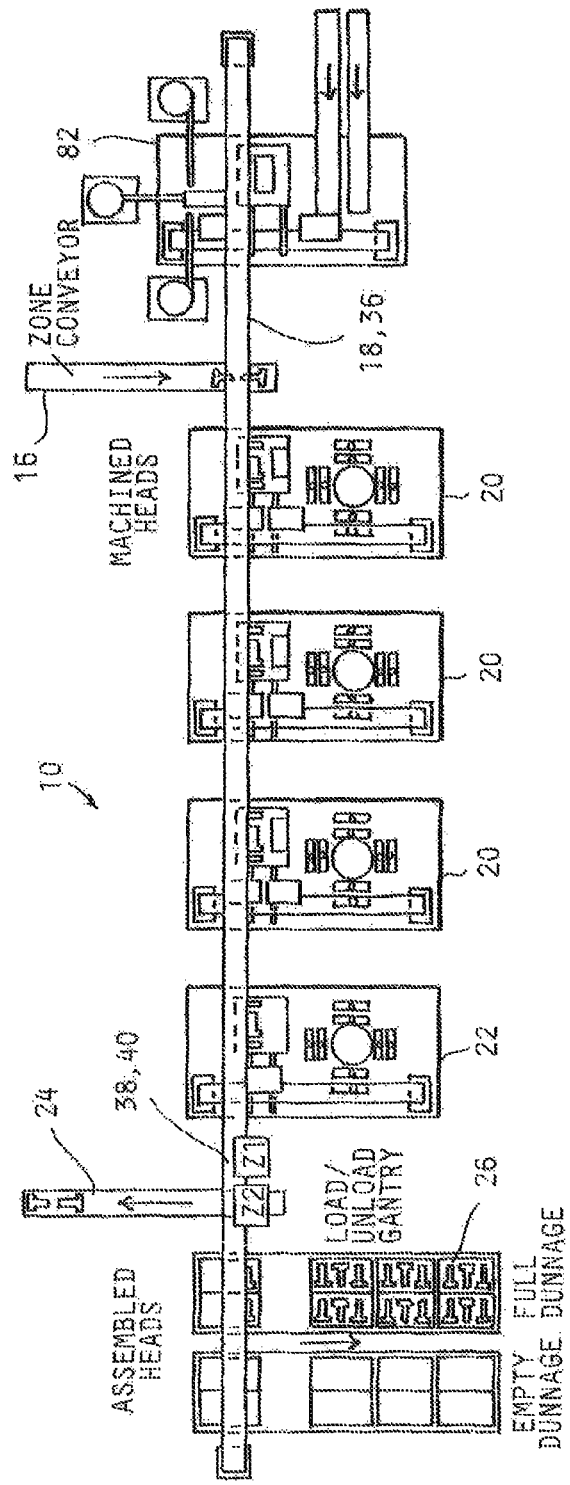
FIG. 11 is an overhead schematic of the method and apparatus for assembling a complex product in a parallel process system of the present invention having a kitting cell incorporated therein.
Figure 12:
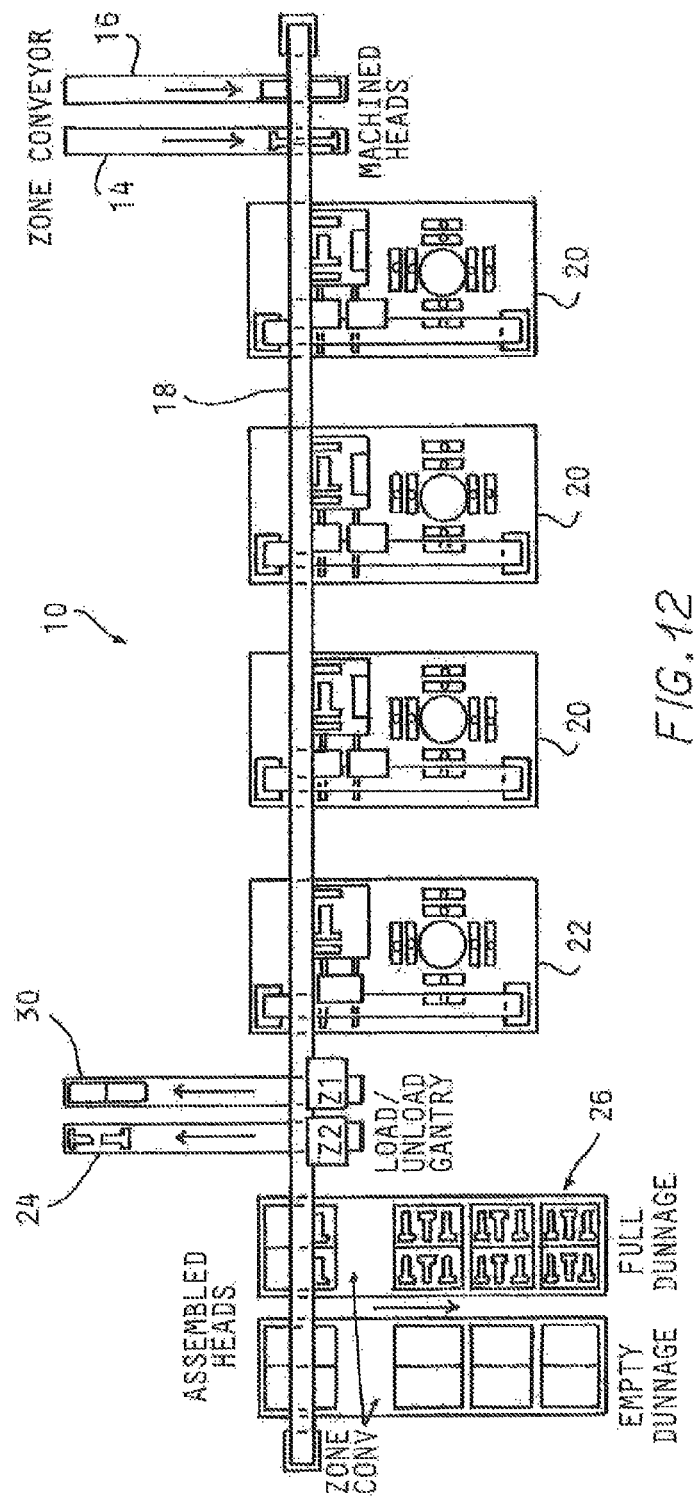
FIG. 12 is an overhead schematic of the method and apparatus for assembling a complex product in a parallel process system of the present invention.

In order to enhance the efficiency of the present invention, the method and apparatus 10 for assembling the complex product 12 in a parallel process system is constructed in a substantially tight spaced, linear formation so as to reduce the amount of factory floor space required for the present invention. However, it should be noted that the present invention is not limited to being linear, but rather, the assembly cells 20 may be placed in a substantially parallel relationship, or the apparatus 10 may be configured in a substantial circular or rectangular configuration. In the situation where the apparatus 10 is in a linear formation, the transport system 18 may include a computerized overhead gantry conveyor 19 that extends from one end of the apparatus 10 to the other, as seen in FIGS. 3, 11, and 12. The overhead gantry conveyor 19 extends upward from the floor of the manufacturing facility through the use of a plurality of vertical support beams 34. A horizontal support beam or guide rail 36 extends from and is connected to the vertical support beams 34. The overhead gantry conveyor 19 of the transport system 18 has a pair of independent arms 38 that move independently vertically but horizontally together along the guide rail 36. The arms 38 of the overhead gantry conveyor 19 have tooling 40 formed on the end of the arms 38 to provide the arms 38 with the ability to pick, move, and place various components and parts into particular locations. The overhead gantry conveyor 19 of the transport system 18 can be automated and computerized in that it may respond to communication from the assembly cells 20 and the test cell 22 in determining when and where certain components must be moved on the apparatus 10.

Figure 13:
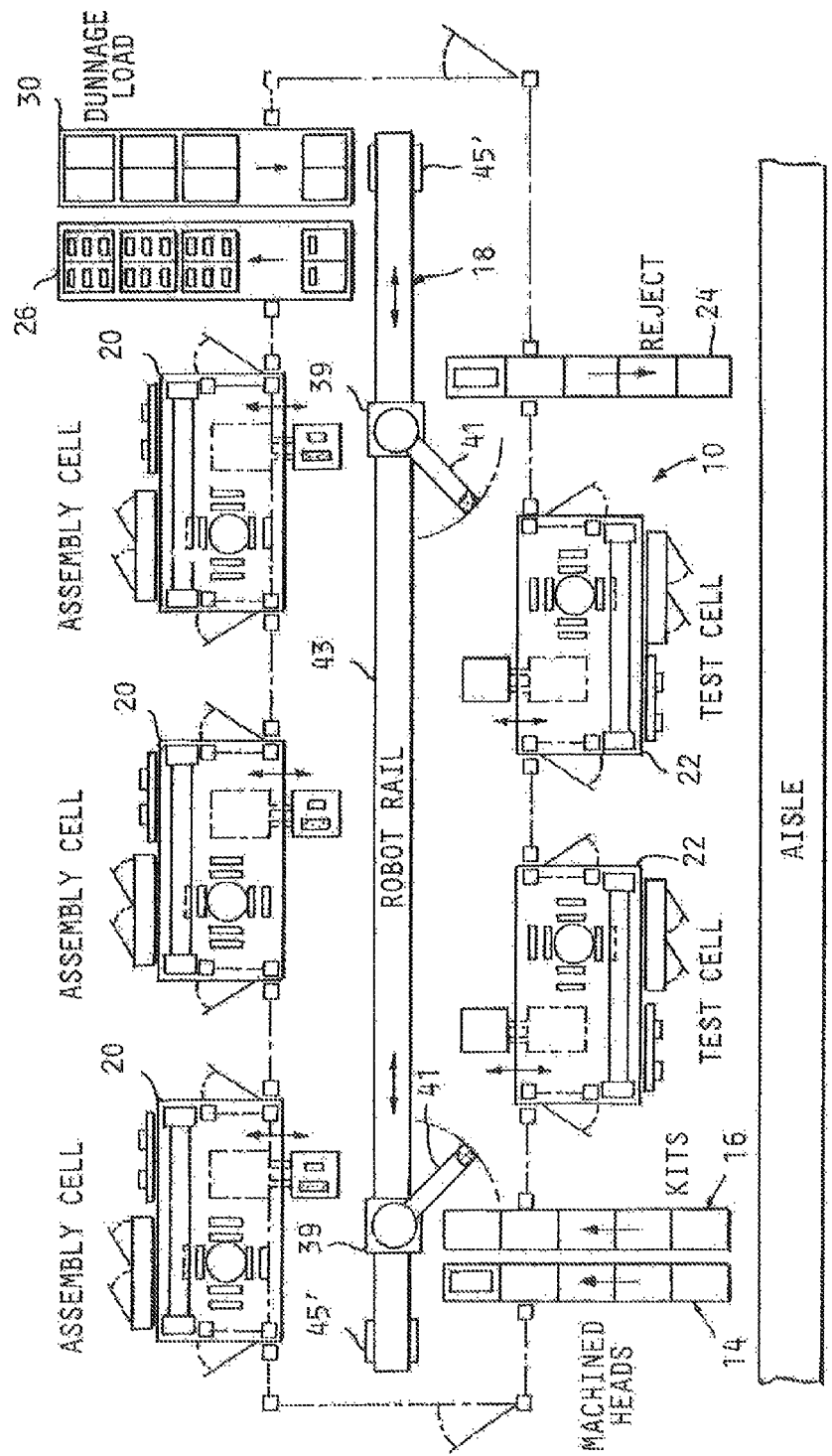
FIG. 13 is an overhead schematic of the method and apparatus for assembling a complex product in a parallel process system of the present invention utilizing a robotic system as the transport system.

In another embodiment, the transport system 18 may include a computerized robot system 39, as shown in FIG. 13. A robotic arm 41 is mounted on a guide rail 43, which is supported by a plurality of vertical support beams 45' extending upward from the floor of the manufacturing facility. The robotic arm 41 moves linearly along the guide rail 43 and may rotate in a number of axes to pick and place various components and parts into various locations along the apparatus 10. The ability of the robotic arm 41 to move in a number of axes allows the workstations 20, 22 of the apparatus 10 to be formed in a substantially rectangular or oval configuration as shown.

To provide the apparatus 10 with the necessary components to build the complex product 12, the loading station 13 provides the part and kit delivery systems 14, 16 which supply the necessary components to the beginning of the apparatus 10, as seen in FIGS. 3-13. The part and kit delivery systems 14, 16 may comprise part and kit delivery conveyors 45 that extend from, and therefore carry, the necessary components from one area of the manufacturing facility to the apparatus 10, or the necessary components may be manually loaded onto the part and kit delivery systems 14, 16 at the apparatus 10. However, it should be noted that although the part and kit delivery conveyors 45 are ideally suited for the present invention, the part and kit delivery systems 14, 16 of the present invention are not limited to part and kit delivery conveyors 45. For instance, automatic guided vehicle systems (not shown) are also anticipated for the part and kit delivery system 14, 16.

The part delivery system 14 supplies a machined base component 25 to the apparatus 10, and the kit delivery system 16 supplies a kit container 28 having a plurality of sub-components 27 contained therein to the apparatus 10. The kit container 28 contains all of the sub-components 27 necessary to properly assemble the base component 25 into the complex product 12. For example, in a cylinder head assembly kit, the sub-components 27 in the kit container 28 could include valve springs, valve seals, valve retainers and keys, spark plugs, and lifters, and the base component 25 could consist of a cylinder head. The kit container 28 may be either assembled by a third-party supplier, or the kit containers 28 may be completed by an automatic kitting cell or workstation 82 integrated into the apparatus 10, as will be described in a further embodiment. It should be noted that the present invention is not limited to the sub-components 27 listed in the kit container 28, but rather, the present invention may include any number of sub-components required to assemble the complex products 12. In an alternative embodiment, the sub-component 27 and the base component 25 could be fed directly into the assembly cells 20 by part chutes.

In order to load the base component 25 and the kit container 28 into the assembly cells 20, the base component 25 and the kit container 28 are transported to one of the three individual assembly cells 20 by means of the transport system 18. Although three assembly cells 20 are shown in the drawings, it should be noted that the present invention is not limited to three assembly cells 20, but rather, any number of assembly cells 20 may be utilized depending on the desired output of the apparatus 10. In the situation where the transport system 18 is an overhead gantry conveyor 19, the arms 38 on the overhead gantry conveyor 19 move independently and vertically downward to engage the base component 25 or the kit container 28 from the part and kit delivery system 14, 16 through the use of the tooling 40 mounted on the ends of the arms 38 of the overhead gantry conveyor 19. The arms 38 then raise the complex product 12 and the kit container 28 from the part and kit delivery system 14, 16 and transport the complex product 12 and the kit container 28 laterally together via the overhead gantry conveyor 19 to the desired assembly cell 20. The arms 38 independently lower the base component 25 and the kit container 28 into the assembly cell 20. Once the base component 25 and the kit container 28 are placed within the assembly cell 20, the arms 38 of the overhead gantry conveyor 19 are raised and moved away from the assembly cell 20, thereby allowing the assembly cell 20 to begin the operation of assembling the sub-components 27 in the kit container 28 and the base component 25 into the complex product 12.

Figure 2:
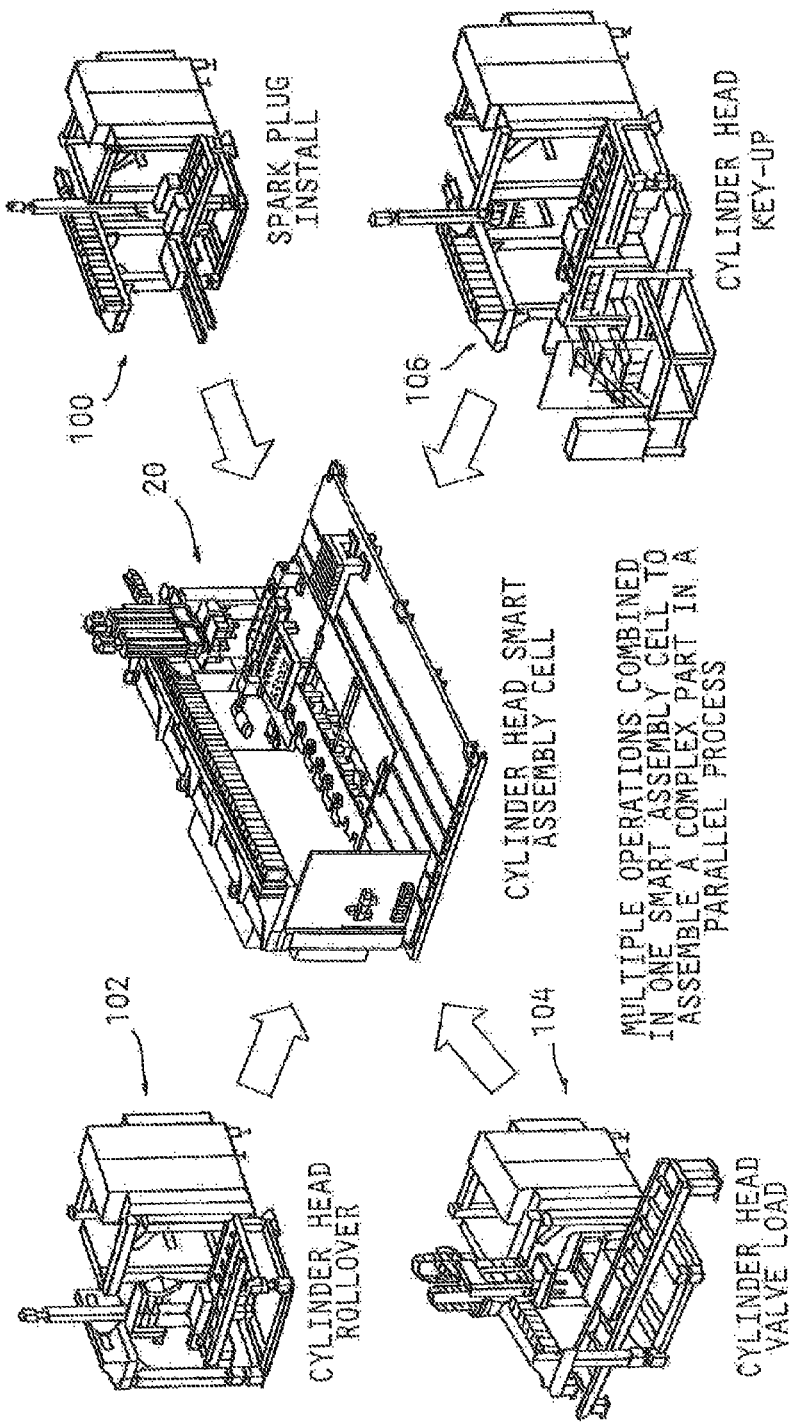
FIG. 2 is a description of a prior art method and apparatus for assembling a complex product being converted to an assembly cell of the present invention.

To assemble the base component 25 and the sub-components 27 in the kit container 28 into the complex product 12, each assembly cell 20 is substantially similar to one another, and thus, the complex product 12 is completely assembled by one of the assembly cells 20. The assembly cells 20 of the present invention are advantageous in that they perform the operation of several individual machines and operations. For example, in assembling the complex product 12, such as a cylinder head, the conventional assembly line utilizing a serial process involves operations including a spark plug install operation 100, a cylinder head rollover operation 102, a cylinder head valve load operation 104, and a cylinder head valve key-up operation 106, as seen in FIGS. 1 and 2. Each of these conventional operations requires individual machines and workstations to complete each of these operations, as previously mentioned. The assembly cells 20 of the present invention combine all of the above-noted operations and equipment needed to assemble the complex product 12 into one individual assembly cell 20. The assembly cells 20 have a substantially rectangular configuration with guard panels 42 and interlocking doors 44 to prohibit anyone from entering the assembly cell 20 while the assembly cell 20 is in operation, as seen in FIGS. 2-7. The assembly cell 20 of the present invention is self-standing and independently supported so that the assembly cell 20 may be freely moved through the use of a forklift (not shown) or overhead crane (not shown). Once the assembly cell 20 is in its desired location, the assembly cell 20 may be anchored to the floor of a manufacturing facility through the use of conventional anchoring fasteners 46. The maneuverability of the assembly cell 20 provides additional flexibility in the present invention in that the apparatus 10 of the present invention may be moved or reconfigured with a minimum amount of effort compared to conventional assembly lines.

As previously mentioned, the base component 25 is placed into the assembly cell 20 by the transport system 18, and the base component 25 is pneumatically clamped by a rollover fixture 48. The rollover fixture 48 holds the base component 25 and allows the base component 25 to rotate 360° so as to position the base component 25 in any desired orientation. A servo driven "Alpha axis" 50 is connected to the rollover fixture 48 and provides for the powered rotation of the rollover fixture 48. When the kit container 28 is placed in the assembly cell 20, the transport system 18 places the kit container 28 on a table 52 secured to a platform 54 within the assembly cell 20. The table 52 may have a counter-sunk edge or locators to locate and hold the kit container 28 in a proper position.

In order for all of the sub-components 27 in the kit container 28 to be assembled to the base component 25, the assembly cell 20 provides motion in three dimensions of linear movement as well as rotational movement. As previously noted, the rollover fixture 48 for holding the base component 25 provides for rotational movement of the base component 25. The rollover fixture 48 is mounted on the same platform 54 that supports the table 52 for holding the kit container 28. The platform 54 is mounted on a first servo-driven rack and pinion gear 56 that provides for linear "X" axis movement of the base component 25 and the kit container 28. The "X" axis servo-driven rack and pinion gear 56 is mounted on the base of the assembly cell 20. A second servo-driven rack and pinion gear 58 is also mounted along one side of the assembly cell 20 and provides a "Y" axis movement lengthwise across the assembly cell 20. Two servo-driven "Z1" and "Z2" axis vertical ball screw slides 60 are connected to the "Y" axis. The "Z1" and "Z2" vertical ball screw slides 60 provide movement up and down or substantially perpendicular to the "Y" axis servo-driven rack and pinion gear 58. The ends of the servo-driven "Z1" and "Z2" axis vertical ball screw slides 60 have a quick change tooling head 62 containing a number of tools 64 to perform specific assembling operations. The quick change tooling head 62 allows for other tooling heads 66 to be utilized on the servo-driven "Z1" and "Z2" axis vertical ball screw slide 60.

To utilize the other tooling heads 66, an automatic eight-position tool changer 68 is mounted to the base of the assembly cell 20. Each of the eight positions of the tool changer 68 provide for a different tooling head 66 to be housed during the assembly process. Each quick change tooling head 66 provides separated tooling for completing a different assembly operation of the sub-components 27 in the kit container 28 and the base component 25 to form the complex product 12. The "Y" axis rack and pinion has the ability to transfer over the desired tooling head 62, 66 in the appropriate position for the "Z1" and "Z2" axis ball screw slide 60 to exchange tooling heads 62, 66.

In order to have the assembly cell 20 perform the necessary assembly operations to form the complex product 12, a programmable controller 76 is mounted on a side of the assembly cell 20. The assembly cell programmable controller 76 provides electronic communication between the servo drives 50, 56, 58, 60 and the tool changer 68 to ensure that the appropriate tooling head 62, 66 and tools 64 are utilized and that the appropriate moves are made with the tools 64 to ensure for proper assembly of the sub-components 27 and base component 25 into the complex product 12.

Figure 8:
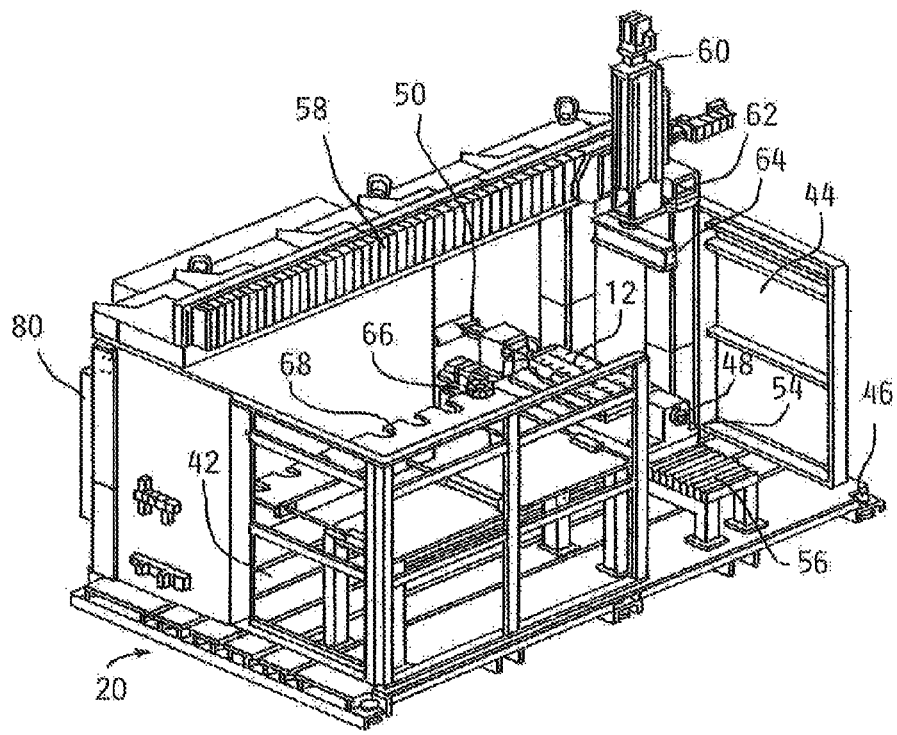
FIG. 8 is an isometric drawing of the test cell of the method and apparatus for assembling a complex product in a parallel process system of the present invention.
Figure 9:
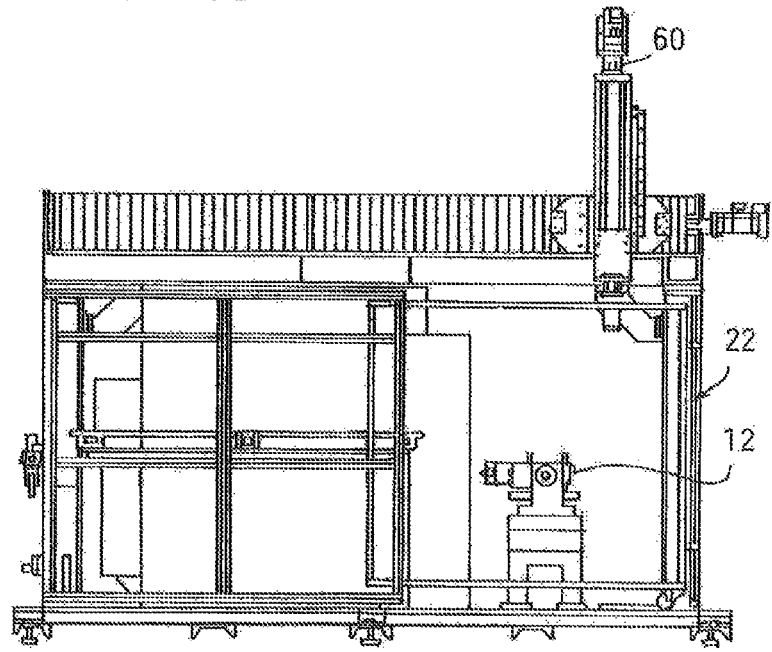
FIG. 9 is a side view of the test cell of the method and apparatus for assembling a complex product in a parallel process system of the present invention.

To ensure that the complex product 12 has been properly assembled, the test cell 22 is located further along the transport system 18 adjacent to the last assembly cell 20. Although a single test cell 22 is shown in FIGS. 3, 11, and 12, it should be noted that the present invention is not limited to a single test cell 22, but rather, any number of test cells 22 (for example, two test cells 22 in FIG. 13) may be utilized depending on the desired throughput of the apparatus 10. In an alternative embodiment, the test cell 22 may even be integrated into the assembly cell 20. The test cell 22 is similarly constructed to the assembly cells 20 in that the test cell 22 has a substantially rectangular configuration with guard panels 42 and interlocking doors 44 surrounding the test cell 22 to prohibit the entry of any persons while the test cell 22 is in operation, as seen in FIGS. 8 and 9. The test cell 22 has a similar rollover fixture 48 to the one provided in the assembly cells 20 for receiving the assembled complex product 12 within the test cell 22. Thus, the rollover fixture 48 pneumatically clamps the complex product 12, and a servo driven "Alpha axis" 50 provides for rotation of the assembled complex product 12 360° in order to access all areas of the assembled complex product 12. The rollover fixture 48 is similarly mounted on a servo-driven "X" axis rack and pinion gear 56 as the assembly cells 20 to provide movement of the assembled complex product 12.

To automatically test the assembled complex product 12, a second servo-driven "Y" axis rack and pinion gear 58, as similarly utilized in the assembly cells 20, is mounted along one side of the test cell 22. A servo-driven "Z" axis single vertical ball screw slide 60, as similarly utilized in the assembly cells 20, is mounted to the servo-driven "Y" axis rack and pinion gear 56, thereby providing movement along the Y and Z axis to a quick change test tooling head 62 mounted on the end of the "Z" axis servo-driven ball screw slide 60. The quick change test tooling head 62 allows for the test tools 64 to be interchanged with various other test tooling heads 66. The test cell 22 also has an automatic eight-position tool changer 68, as similarly utilized in the assembly cells 20. Each of the positions of the tool changer 68 holds a test tool head 66. This allows for the interchanging of test tools 64 on the "Z" axis servo-driven ball screw slide 60.

Communication between the servo drives 50, 56, 58, 60 and the tool changer 68 is provided through a programmable controller 80 mounted on the side of the test cell 22. The programmable controller 80 coordinates the movement and operation of the servo drives 50, 56, 58 and the tool changer 68 to ensure for the appropriate movement and operation of the test tools 64 for testing the assembly functionality of the assembled complex product 12. The programmable controller 80 will also determine whether the complex product 12 is defective or whether the complex product 12 is dimensionally and functionally acceptable. The test cell programmable controller 80 is also in electronic communication with the assembly cell programmable controllers 76 to ensure all programmable equipment is in concert with one another.

Once the assembled complex product 12 has been tested in the test cell 22, the transport system 18 removes the assembled complex product 12 from the test cell 22 to the delivery station 23. If the test cell 22 determines that the assembled complex product 12 is defective, i.e., a component has not been properly assembled in the complex product 12, a particular portion of the complex product 12 is not in tolerance, a portion of the complex product 12 is not functioning properly, etc., then the transport system 18 carries the defective complex products 12 to the part reject area or conveyor 24 of the delivery station 23, as seen in FIGS. 3 and 10-14. The part reject area or conveyor 24 of the delivery station 23 is positioned further along the transport system 18 and adjacent to the test cell 22. Once the defective complex product 12 is placed on the part reject area or conveyor 24 of the delivery station 23, the defective complex product 12 is carried to an inspection station (not shown), wherein the defective complex product 12 may be further analyzed and reworked, or the defective complex product 12 may be carried to a storage area (not shown), wherein the defective complex product 12 may be collected by a laborer.

A kit container return conveyor 30 may also extend adjacent to and substantially parallel to the part reject area or conveyor 24 of the delivery station 23. The transport system 18 collects the empty kit containers 28 from the assembly cells 20 once the sub-components 27 have been removed from the kit container 28 and assembled to the base component 25 to form the complex product 12. The transport system 18 transfers the empty kit container 28 from the assembly cells 20 to the kit container return conveyor 30, where the kit containers 28 may be collected, refilled, and returned to the beginning of the apparatus 10.

If the assembled complex product 12 passes inspection in the test cell 22, then the transport system 18 removes the assembled complex product 12 from the test cell 22 and transfers the assembled complex product 12 to the automatic part dunnage or part return system 26 of the delivery station 23. From there, the completed complex product 12 is transferred to another location, where the completed complex product 12 may be installed as a sub-assembly in another product.

Figure 10:
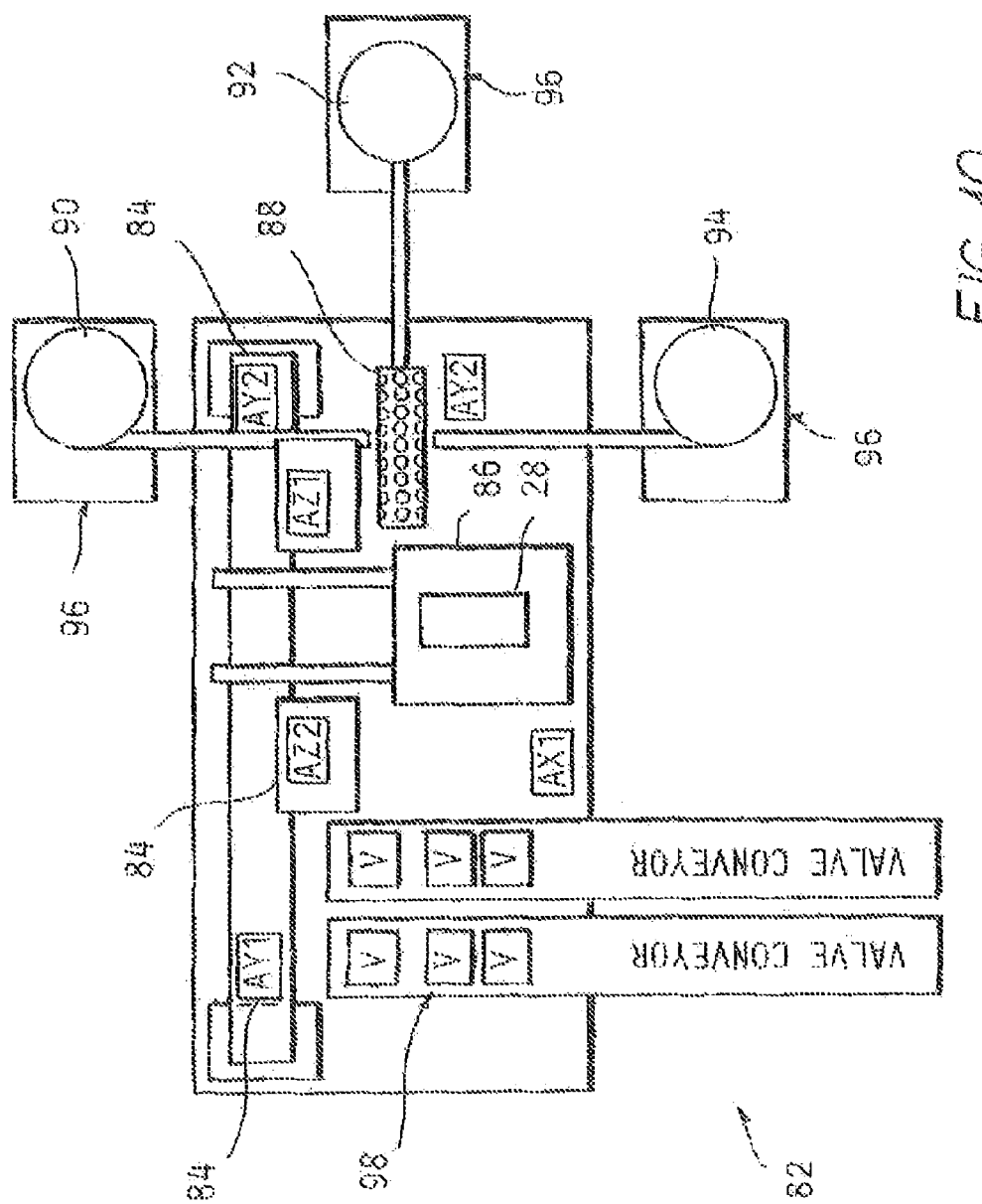
FIG. 10 is an overhead schematic diagram of the kitting cell of the method and apparatus for assembling a complex product in a parallel process system of the present invention.

In another embodiment, the kit container 28 may be automatically filled with the sub-components 27 in the kitting cell 82, as opposed to delivering the kit container 28 pre-filled with the sub-components 27 to the kit delivery system 16, as seen in FIGS. 10 and 11. The kitting cell 82 is positioned under the starting end of the transport system 18, and the kitting cell 82 has a rectangular configuration that is enclosed by guarding panels 42 and interlocking doors 44, similar to the assembly cells 20 and the test cell 22 as seen in FIGS. 4-5 and 8-9. A servo-driven "Y1" and "Y2" dual independent rack and pinion gantry 84 is mounted along one side of the kitting cell 82. A servo-driven "X" axis rack and pinion slide 86 supports the kit container 28 and provides movement of the kit container 28 along the X axis. A servo-driven "Y3" axis comb escapement 88 receives various sub-components 27. For example, in a cylinder assembly line, the valve seal 90, the valve spring 92, and the valve retainer and key 94 may be received from separate part-feeding systems 96. By moving the servo-driven "Y2" axis rack and pinion gantry 84 slide over the servo-driven "Y3" axis comb escapement 88, the valve sub-components 90, 92, 94 may be picked and placed into the kit container 28. At the opposite side of the kitting cell 82, a pair of valve sub-component conveyors 98 delivers sub-components 27, for example, in a cylinder head assembly line, such sub-components may consist of valves and spark plugs. The servo-driven "Y1" rack and pinion gantry slide moves over the valve sub-component conveyors 98, wherein the sub-components 27 can be loaded into the kit container 28. Once the kit container 28 is loaded with the sub-components 27, the transport system 18 picks and lifts the kit container 28 from the kitting cell 82 and transfers the kit container 28 to one of the assembly cells 20.

In operation, the kit containers 28 are supplied to the apparatus 10 by the kit delivery system 16, which may utilize the kit delivery conveyor 45 to deliver the kit containers 28 in a filled state, or the kit delivery system 16 may utilize the kitting cell 82 to fill the kit containers 28 with the appropriate sub-components, as previously described and shown in FIGS. 3-13. The base component 25 is supplied to the apparatus 10 by the part delivery system 14, which may utilize the part and kit delivery conveyor 45 for loading the complex product 12. The transport system 18 picks up and places the base component 25 into the rollover fixture 48 in one of the assembly cells 20. In addition, the transport system 18 picks up a kit container 28 and places the kit container 28 on the table 52 in the same assembly cell 20. The assembly cell 20 assembles each sub-component 27 in the kit container 28 to the base component 25 by using a particular tooling head 62, 66. The tooling heads 62, 66 will be exchanged so that each of the respective sub-components 27 will be assembled to the base component 25 with the appropriate tools 64. Once the complex product 12 is completely assembled, the transport system 18 removes the assembled complex product 12 and transfers the complex product 12 to the test cell 22. In addition, the empty kit container 28 is removed from the assembly cell 20 by the transport system 18 and transferred to the kit container return conveyor 30. Once the assembled complex product 12 is placed in the rollover fixture 48 of the test cell 22, the test cell 22 automatically performs the appropriate testing to ensure that the complex product 12 is not defective. If the test cell 22 determines that the assembled complex product 12 is defective, then the transport system 18 removes the defective complex product 12 and places it on the part reject area or conveyor 24 of the delivery station 23, wherein the defective complex product 12 may be reworked or transferred to another area. If the test cell 22 determines that the assembled complex product 12 is not defective, then the transport system 18 removes the assembled complex product 12 from the test cell 22 and transfers the assembled complex product 12 into the automatic part dunnage load system or part return system 26 of the delivery station 23. The complex products 12 may then be transported to a desired area.

Figure 14:
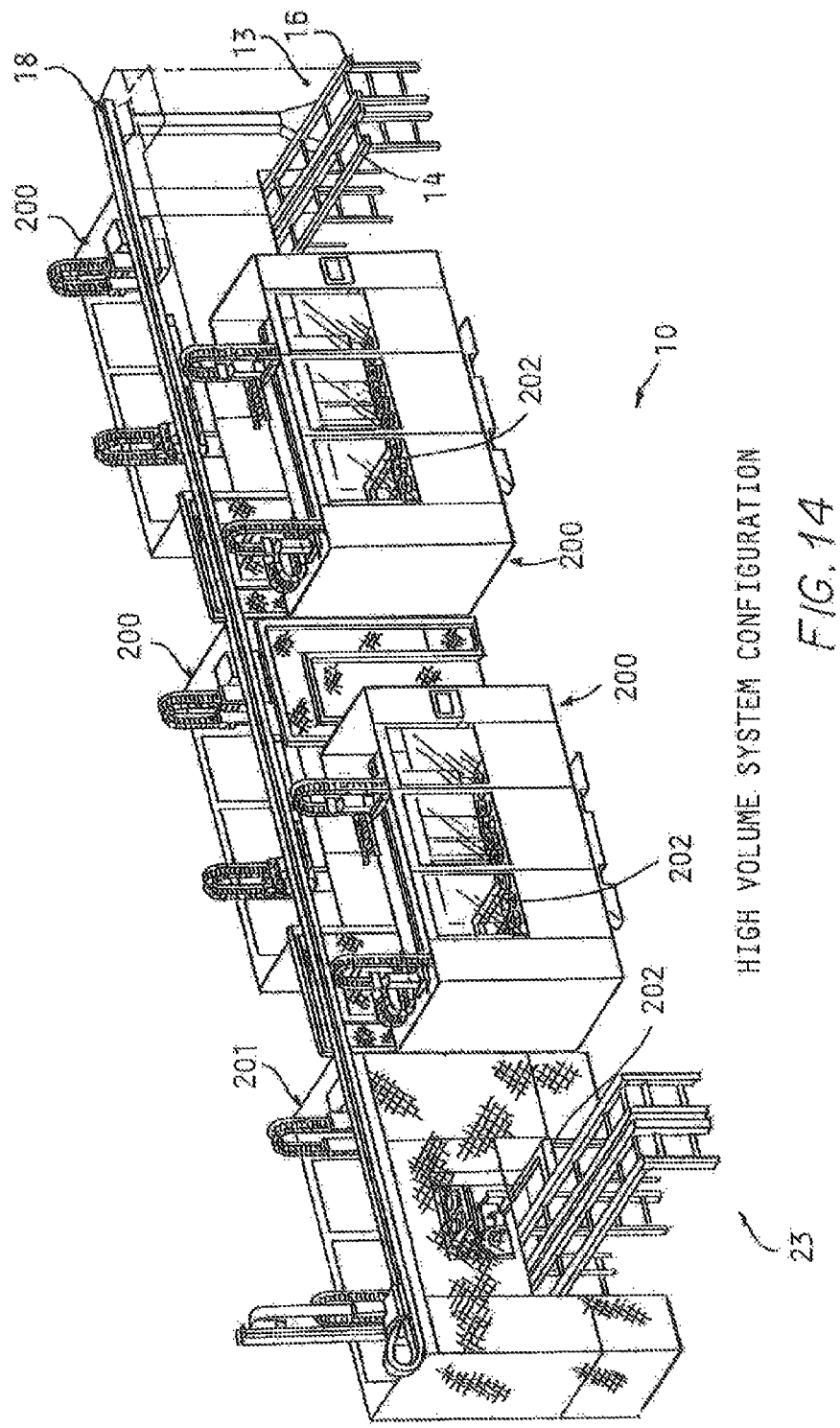
FIG. 14 is an isometric drawing of an alternative embodiment of the method and apparatus for assembling a complex product in a parallel process system of the present invention.
Figure 15:
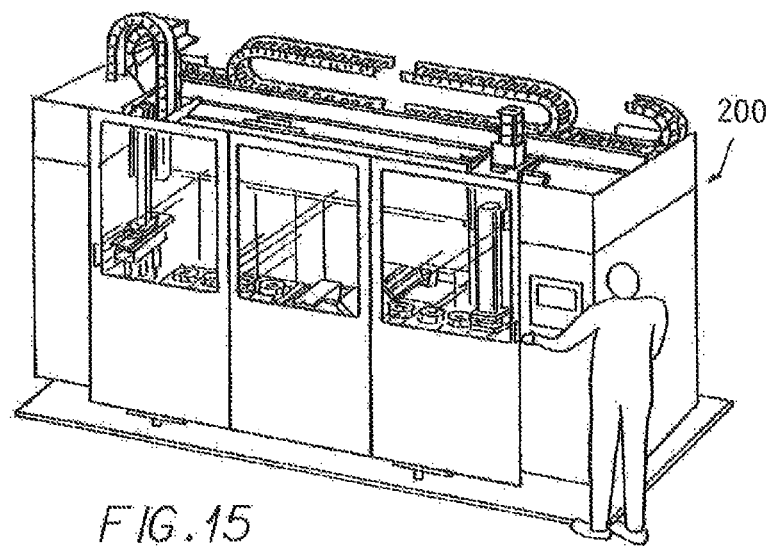
FIG. 15 is an isometric drawing of an alternative embodiment of an assembly cell of the method and apparatus for assembling a complex product in a parallel process system of the present invention.
Figure 16:
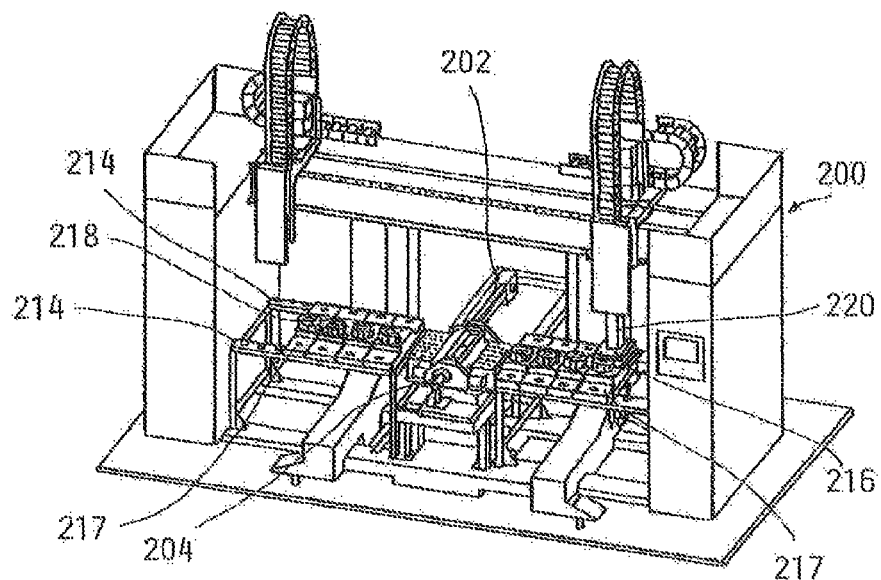
FIG. 16 is a broken isometric drawing of the assembly cell of an alternative embodiment of the method and apparatus for assembling a complex product in a parallel process system of the present invention.
Figure 17:
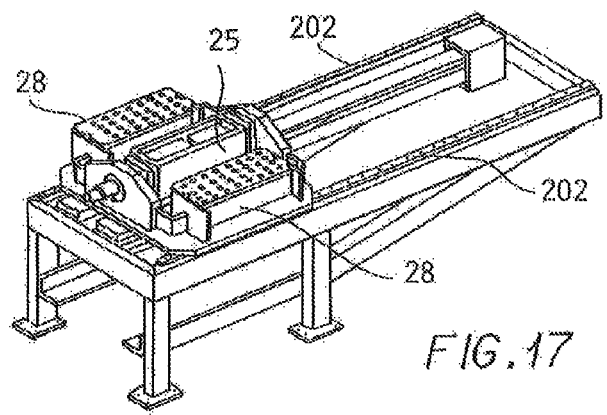
FIG. 17 is an isometric drawing of a carriage and dual linear rails shown in a loaded position of an alternative embodiment of the method and apparatus for assembling a complex product in a parallel process system of the present invention.
Figure 18:
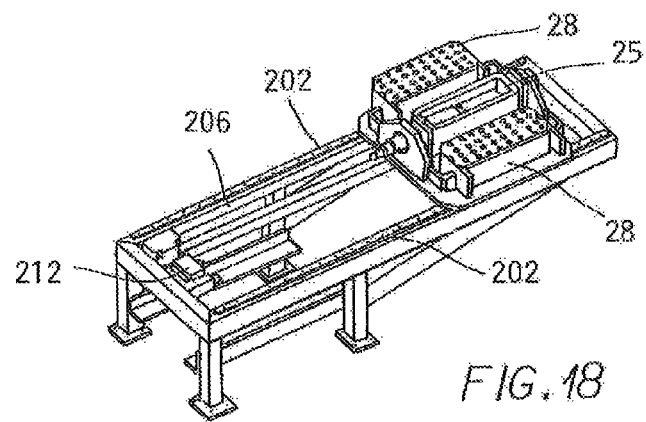
FIG. 18 is an isometric drawing of a carriage and dual linear rails showing the carriage in an unloaded position of an alternative embodiment of the method and apparatus for assembling a complex product in a parallel process system of the present invention.
Figure 19:
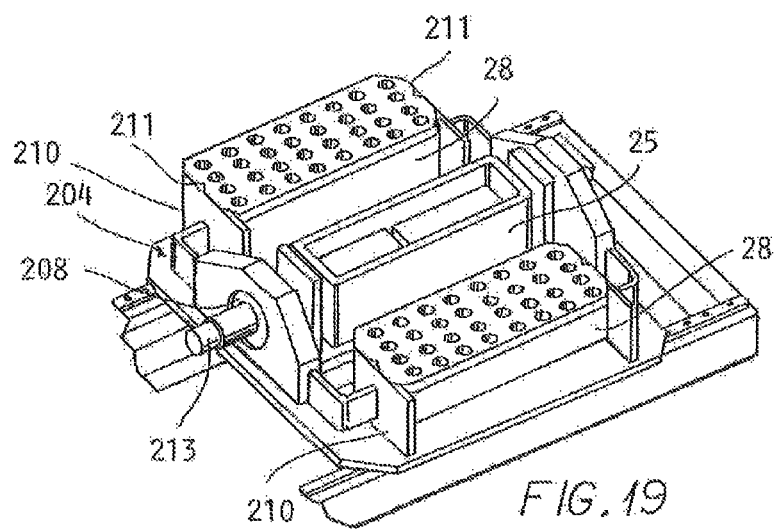
FIG. 19 is an isometric drawing of the carriage in an alternative embodiment of the method and apparatus for assembling a complex product in a parallel process system of the present invention.

In an alternative embodiment to the method and apparatus 10 for assembling the complex product 12 in a parallel process system of the present invention, the loading station 13 has a part delivery system 14 and a kit delivery system 16, as previously described. In addition, the delivery station 23, as previously described, may also be provided. However, the assembly cells 20 and the test cell 22 may take on several different features. As seen in FIGS. 14-16, assembly cells 200 and a test cell 201 have a similar overall configuration to the previously-described assembly cells 20 and test cell 22; however, dual linear rails 202, as seen in FIGS. 14-19, allow the kit containers 28 and base components 25 to be loaded outside the assembly cell 200 and test cell 201 by having the dual linear rails 202 extend from the outside to the inside of the assembly cell 200 and test cell 201. This allows the individual assembly cells 200 and test cell 201 to be staggered, as shown in FIG. 14. With this type of configuration, the transport system 18, as previously described, loads and unloads the kit containers 28, the base component 25, and the complex product 12 from outside the assembly cells 200 and the test cell 201. By staggering the assembly cells 200 and test cell 201, the ends of the linear rails 202 are linearly aligned directly under the transport system 18. This particular configuration allows for a high volume of output of the complex product 12.

In order to move the kit containers 28, base component 25, and complex product 12 to and from the assembly cells 200 and test cells 201, a carriage 204 is slidably attached to the dual linear rails 202 and moves between an unloaded position, wherein the carriage 204 is outside the assembly cell 200 or test cell 201, and a loaded position, wherein the carriage 204 is inside the assembly cell 200 or test cell 201. The carriage 204 is driven between the unloaded position and the loaded position through the use of a belt drive 206. The carriage 204 includes a rotational fixture 208 for engaging and rotatably positioning the base component 25 in the assembly cell 200 and the complex product 12 in the test cell 201 in a predetermined orientation. In addition, the carriage 204 provides a pair of fixtures 210 adjacent each side of the rotational fixture 208 for engaging a pair of kit containers 28. The kit containers 28 have a pair of clips 211 which extend from the ends of the kit container 28 to complementarily engage the fixture 210 and secure the kit container 28 to the carriage 204. Once the kit containers 28 and base component 25 are loaded onto the carriage 204, the carriage 204 may be moved to the loaded position within the assembly cell 200. Similarly, once the complex product 12 is loaded on the carriage 204, the carriage 204 may be moved to the loaded position in the test cell 201. A servo drive 212 mounted at the end of the dual linear rails 202 within the assembly cell 200 and test cell 201 may engage and rotate a shaft 213 on the rotational fixture 208 in the desired position when the carriage 204 is in the loaded position. The transport system 18, as previously described, loads the kit containers 28 and the base component 25 into the carriage 204 of the assembly cell 200 when the carriage 204 is in the unloaded position. Similarly, the transport system 18 may load the complex product 12 into the carriage 204 of the test cell 201 when the carriage 204 is in the unloaded position.

Figure 22:
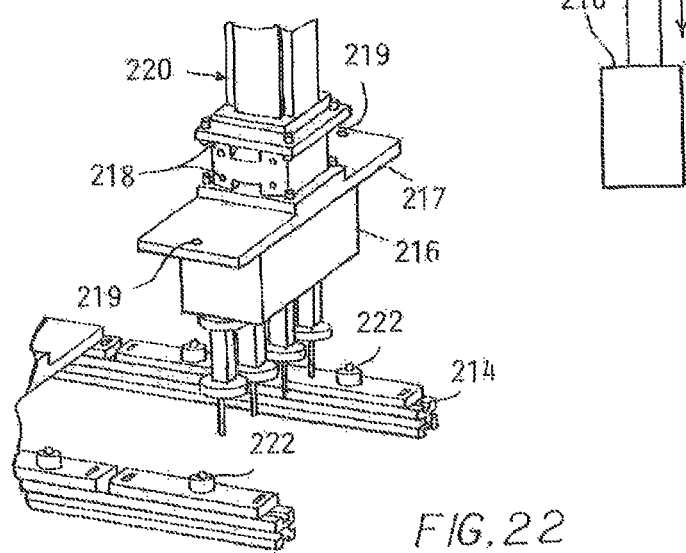
FIG. 22 is a perspective view showing the automatic tool changers in an alternative embodiment of the method and apparatus for assembling a complex product in a parallel process system of the present invention.

When the carriage 204 is in the loaded position within the assembly cell 200 and test cell 201, a pair of substantially parallel rails 214 extends substantially perpendicular from both sides of the dual linear rails 202, as seen in FIGS. 16 and 22. Each set of substantially parallel rails 214 has a plurality of assembly tools 216 in the assembly cell 200 and test tools 216 in the test cell 201 that are nested between the substantially parallel rails 214. The tools 216 have a tool adapter plate 217 which has apertures 219 extending there through for engaging pins 222 on the substantially parallel rails 214 for securing and locating the tools 216. Each tool 216 is different in order to perform different assembly and test functions on the complex product 12. Each tool 216 has a quick change adapter 218 which may be engaged and disengaged by a tool arm 220. Through the use of the quick change adapter 218, the tool arm 220 can quickly engage and disengage the respective tool 216.

Figure 20:
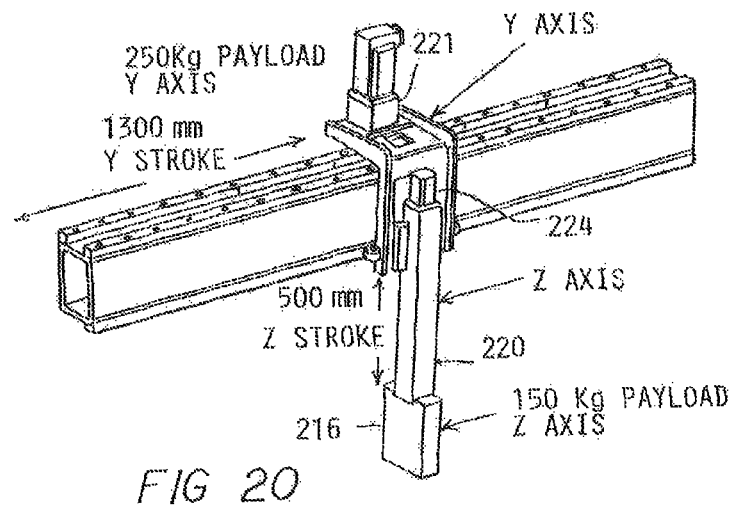
FIG. 20 is an isometric drawing showing the tooling arm of an alternative embodiment of the method and apparatus for assembling a complex product in a parallel process system of the present invention.
Figure 21:
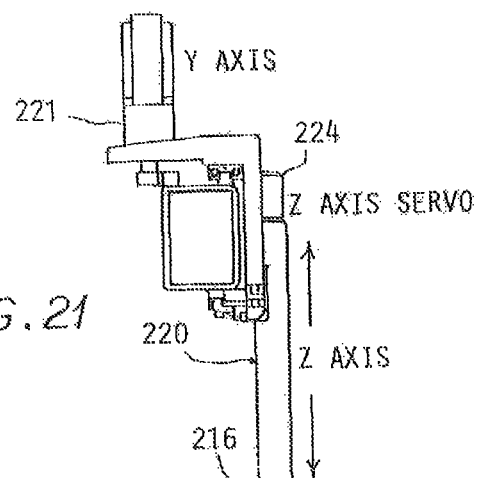
FIG. 21 is a side view of the tooling arm in an alternative embodiment of the method and apparatus for assembling a complex product in a parallel process system of the present invention.
Figure 24:
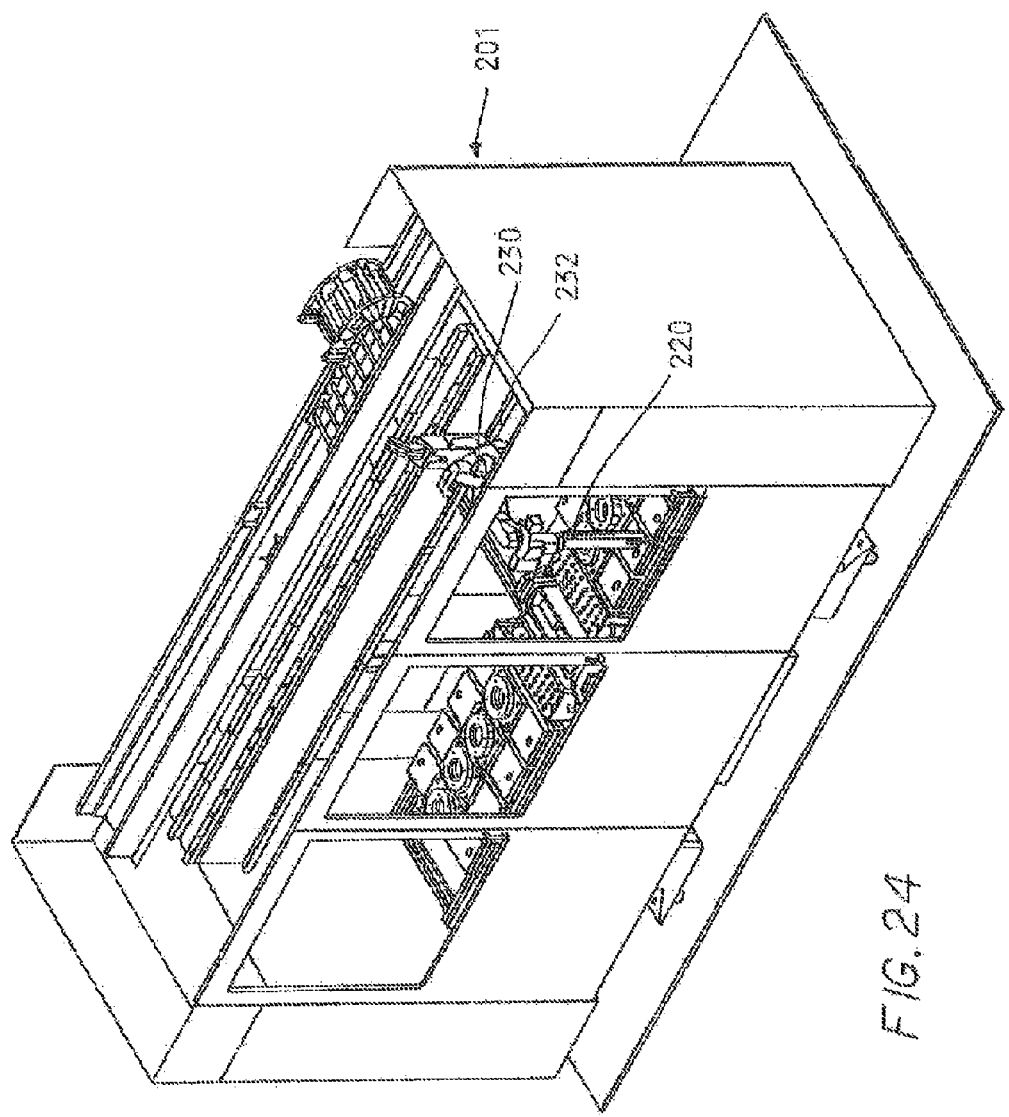
FIG. 24 is a perspective view showing a robotic arm used as a tool changer in an alternative embodiment of the method and apparatus for assembling a complex product in a parallel process system of the present invention.

As seen in FIGS. 20 and 21, the tool arm 220 may be driven along a Z-axis through the use of a ball screw and servo 224, thereby allowing for the lifting and lowering of the assembly and test tools 216 from the substantially parallel rails 214. The tool arm 220 may also be driven length-wise along the assembly cell 200 and test cell 201 by a rack and pinion Y-axis gantry 221 and servo, thereby allowing the assembly tool 216 to be moved to and from the kit containers 28 and the base component 25 in the assembly cell 200, or by allowing the test tool 216 to be moved to and from the complex product 12. By having a pair of tooling arms 220 and kit containers 28 on each side of the dual linear rails 202, the sub-components 27 and the base component 25 can be assembled into the complex product 12 in a timelier manner. Similarly, the pair of tooling arms 220 in the test cell 201 can expedite the testing of the complex product 12. In an alternative embodiment, the tool arm 220 may comprise of a robotic arm 230, as seen in FIG. 24, which is driven along a rail 232 and provides multiple degrees of movement.

The test cell 201 of this embodiment of the present invention is similar to the assembly cell 200 except that the complex product 12 is loaded into the carriage 204, as opposed to the kit container 28 and base component 25. In addition, testing tools 216 are utilized in the test cell 201, as opposed to assembly tools 216 in the assembly cells 200. Structurally, the assembly cells 200 and test cell 201 remain the same.

Figure 23:
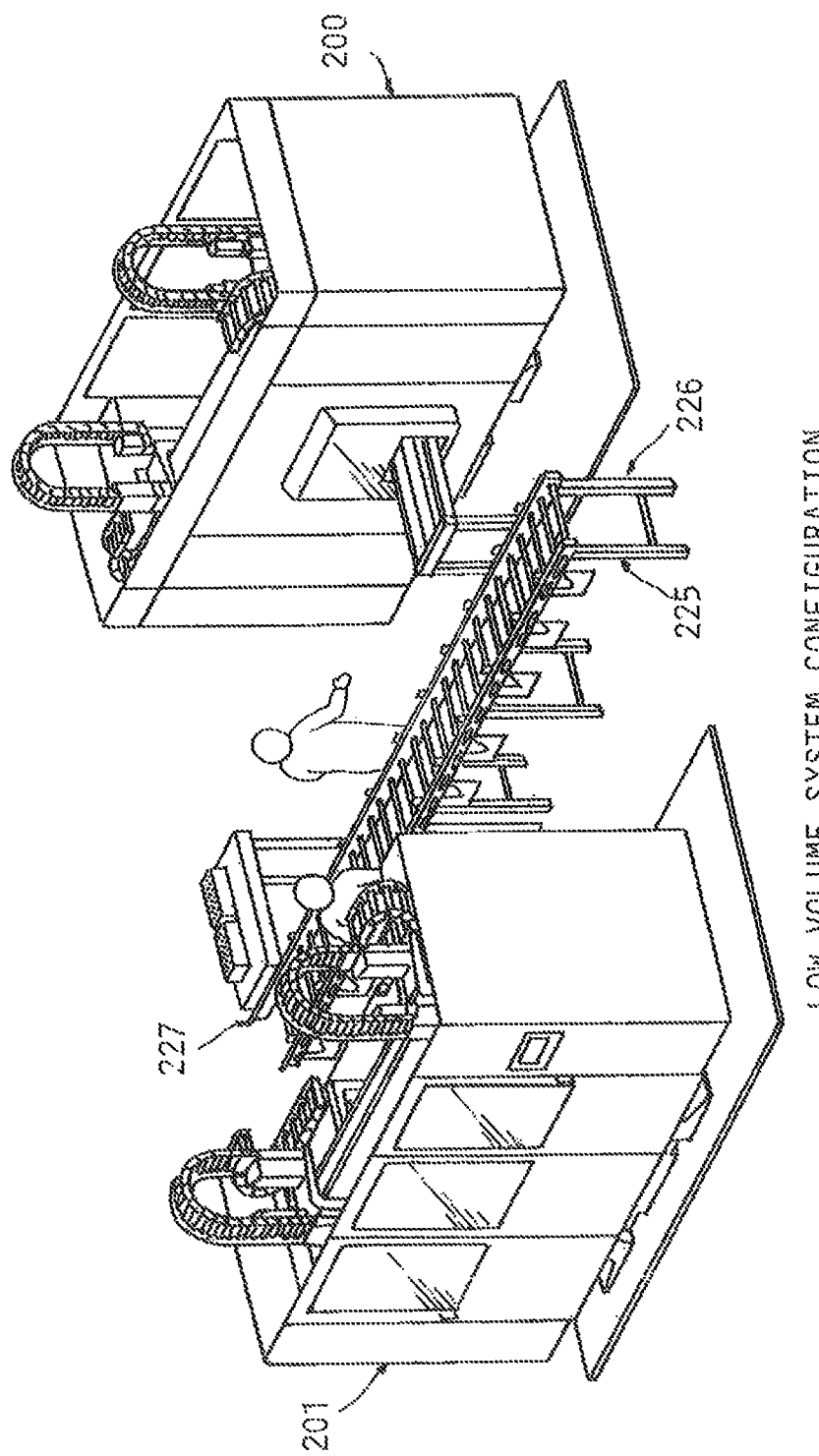
FIG. 23 is a perspective view showing a low volume system configuration of an alternative embodiment of the method and apparatus for assembling a complex product in a parallel process system of the present invention.

It should also be noted that in another embodiment, a low volume system configuration of the present invention may be employed by having an assembly cell 200 and a test cell 201 opposite one another with the loading station conveyor 225, 226 and the delivery station conveyor 227 extending between the assembly cell 200 and the test cell 201, as seen in FIG. 23. Thus, the kit container 28 and the base components 25 may be manually loaded onto the carriage 204 of the assembly cell 200, or the kit container 28 and the base components 25 may be automatically loaded through one of the previously-described transport systems 18. Loading the complex products 12 into the testing cell 201 may also be done manually or automatically.

While the invention has been described in connection with what is present considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A method for assembling a complex product, the steps comprising:

providing a single, complete set of sub-components in a kit container and one base component to a loading station for fully assembling said complex product;

automatically transporting said complete set of sub-components and said one base component to at least one computerized cell through the use of a transport system;

automatically assembling said collection of sub-components and said base component into said complex product through the use of said at least one computerized cell;

automatically testing said complex product for functionality through the use of said at least one computerized cell; and automatically transporting said complex product to a delivery station through the use of said transport system.

2. The method stated in claim 1, wherein said step of providing a single, complete set of sub-components and one base component further comprise the steps of:

manually loading said sub-components and said one base component into said transport system.

3. The method as stated in claim 1, further comprising the steps of:

providing a computerized tool changer in said at least one computerized cell for automatically providing an appropriate tool for assembling and testing said sub-components to said at least one base component for forming said complex product; and providing three axes of linear movement between said at least one base component and said appropriate tool.

4. The method stated in claim 1, wherein said at least one computerized cell further comprises the steps of:
- automatically assembling said collection of said sub-components and said base component into said complex product; and
- automatically testing said complex product to ensure for the proper assembly functionality of the complex product.

5. A method for assembling a complex product, the steps comprising:
- a collection of sub-components and at least one base component to a loading station for assembling said complex product;
- automatically transporting said collection of said sub-components and said at least one base component to at least one computerized cell through the use of a transport system;
- automatically assembling and testing said collection of sub-components and said base component into said complex product through the use of said at least one computerized cell;
- automatically transporting said complex product to a delivery station through the use of said transport system;
- wherein said step of providing a collection of sub-components and at least one base component further comprise the steps of manually loading said sub-components and said at least one base component into said transport system; and
- wherein said step of providing a collection of sub-components and at least one base component further comprise the steps of:
  - providing a part delivery system for supplying said at least one base component to said transport system; and
  - providing a kit delivery system for supplying said sub-components in a kit container to said transport system.

6. The method as stated in claim 5, wherein said step of providing a part delivery system further comprises the steps of:
- providing a conveyor for delivering said at least one base component to said transport system.

7. The method as stated in claim 6, wherein said step of providing a kit delivery system for supplying said sub-components in a kit container further comprises the steps of:
- automatically assembling said sub-components into said kit container through the use of at least one kit assembly cell; and
- providing a conveyor for delivering said kit container to said transport system.

8. The method as stated in claim 7, wherein said step of providing a part delivery system further comprises the steps of:
- providing a conveyor for delivering said kit container with said sub-components assembled therein to said transport system.

9. The method as stated in claim 5, wherein said step of transporting said collection of said sub-components and said at least one base component further comprise the steps of:
- providing an overhead gantry system for transporting said kit container, said at least one base component, and said complex product to and from said loading station, said at least one computerized cell, and said delivery station.

10. The method as stated in claim 5, wherein said step of transferring said collection of said sub-components and said at least one base component further comprises the steps of:
- providing a computerized robotic arm for automatically transporting said kit container, said at least one base component, and said complex product to and from said loading station, said at least one computerized cell, and said delivery station.

11. The method as stated in claim 5, further comprising the steps of:
- securing said at least one base component in a rollover fixture in said at least one computerized cell for rotating said at least one base component in a desired orientation; and
- placing said kit container within one of said plurality of computerized cell.

12. A method for assembling a complex product, the steps comprising:
- providing a single, complete set of sub-components in a kit container and one base component to a loading station for assembling said complex product;
- automatically transporting said complete set of sub-components and said one base component to at least one computerized assembly cell through the use of a transport system;
- automatically assembling said complete set of said sub-components and said base component into said complex product through the use of at least one computerized robotic arm in said one computerized assembly cell;
- automatically testing said complex product for functionality when assembled through the use of at least one computerized robotic arm in a computerized testing cell;
- providing a computerized tool changer in said one computerized cell for automatically providing an appropriate assembly tool to said robotic arms for assembling said sub-components to said one base component for forming said complex product;
- providing a computerized tool changer in said one computerized testing cell for automatically providing an appropriate testing tool to said at least one computerized robotic arm in said computerized testing cell; and
- automatically transporting said complex product to a delivery station through the use of said transport system.

13. The method stated in claim 12, further comprising the steps of:
- providing three axes of linear movement to the robotic arms in order to properly assemble and test the complex product.

14. The method as stated in claim 13, further comprising the steps of:
- providing a conveyor for delivering said one base component and said sub-components to said transport system.

* * * * *